US009367677B1

(12) United States Patent
Adhami et al.

(10) Patent No.: US 9,367,677 B1
(45) Date of Patent: Jun. 14, 2016

(54) SYSTEMS AND METHODS FOR USER AUTHENTICATION USING EYE MOVEMENT AND PUPIL SIZE CHANGE MATCHING

(71) Applicants: Reza Adhami, Madison, AL (US); Ali Alhaj Darwish, Huntsville, AL (US)

(72) Inventors: Reza Adhami, Madison, AL (US); Ali Alhaj Darwish, Huntsville, AL (US)

(73) Assignee: The Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 14/498,785

(22) Filed: Sep. 26, 2014

(51) Int. Cl.
*G06F 21/32* (2013.01)

(52) U.S. Cl.
CPC ...................................... *G06F 21/32* (2013.01)

(58) Field of Classification Search
CPC ................. G06F 21/32; G06F 21/577; G06F 2221/2115; G06F 19/20; G06F 21/31; G06F 21/35; G06K 9/00597; G06K 9/00892; G06Q 20/204; G06Q 20/3224; G06Q 20/3274; G06Q 20/3278; G06Q 20/4012; G06Q 20/40145; G06Q 20/42; G06Q 20/425; G06Q 20/20; G06Q 20/3674; G06Q 20/40; H04L 2209/56; H04L 9/32; H04L 9/321; H04L 9/3215; H04L 9/3231; H04W 12/06

USPC .............................................................. 726/19
See application file for complete search history.

(56) References Cited

U.S. PATENT DOCUMENTS 7,986,816 B1 * 7/2011 Hoanca .............. G06K 9/00597
382/115
2013/0336547 A1 * 12/2013 Komogortsev ........ A61B 5/117
382/117

* cited by examiner

*Primary Examiner* — Kambiz Zand
*Assistant Examiner* — Abiy Getachew
(74) *Attorney, Agent, or Firm* — Maynard Cooper & Gale, P.C.; Jon E. Holland (57) ABSTRACT

A system for eye movement and pupil size change matching for user authentication includes an ocular sensor that is configured to sense eyes of a user and collect data indicative of the user's eye movement and pupil size changes. When a user's eyes are detected, the logic analyzes data collected by the ocular sensor in order to determine whether the sensed data match data extracted from a template defined by the eye movement and pupil size changes of an authorized user. If so, the user is authenticated and is permitted to access at least one restricted resource. As an example, the user may be permitted to access an application or sensitive data stored on a computer system or to access a restricted area, such as a room of a building.

18 Claims, 5 Drawing Sheets

SYSTEMS AND METHODS FOR USER AUTHENTICATION USING EYE MOVEMENT AND PUPIL SIZE CHANGE MATCHING

RELATED ART

Data security is an important concern for electronic devices such as cellular telephones (e.g., iPhone®), laptop computers, tablet computers (e.g., iPad®), desktop computers, building and vehicle access control, and personal digital assistants (PDAs). Such devices are often protected from unauthorized use through the use of password authentication, or using other methods such as security card (e.g., RFID) scanners. In this regard, before allowing a user to operate the device or sometimes an application on the device, the user is typically prompted for a password that must match a previously-stored password or required to scan a security card. If the passwords do not match or the security card is not authorized, then the user is prevented from accessing electronic information or applications contained in the device until a matching password is successfully entered.

Password and security card authentication techniques have several drawbacks, making their use less than ideal for many applications. In this regard, a password is vulnerable to hackers who may improperly learn of a user's valid password in a number of ways thereby compromising the security of the information contained in the device. Also, an authorized user is required to remember his password and may be undesirably prevented from accessing information or applications in the mobile device if he forgets his password. In addition, entering a password each time the user wishes to access sensitive information or applications is somewhat burdensome. Furthermore, security cards are highly vulnerable to use by unauthorized users, for example when theft or loss of the card occurs. While remote security card deactivation is possible, such deactivation often may not take place until after sensitive data has been compromised by unauthorized access.

Data security concerns also extend beyond initial user authentication by the mobile device or application and continue while the electronic device is in operation. Data security may be compromised if an unauthorized user assumes operation after initial authorization. In this regard, it is often desirable for a user to be authenticated at various times during operation of the electronic device, e.g., when conducting a transaction. Also, it is an important data security concern that an unauthorized user may access sensitive data by viewing an electronic device simultaneously with but transparently to the authorized user, for example, by "shoulder surfing." Requiring a password or prompting a user for authentication during use would prove somewhat burdensome to the user, and does not address security threats presented by techniques such as "shoulder surfing."

To address some of the above drawbacks, other authentication techniques have been developed, such as fingerprint authentication and other biometric authentication. However, fingerprint authentication and other types of biometric authentication are known to be vulnerable to counterfeiting and spoofing. One technique of biometric authentication focuses on the biometric features of the eyes, in particular, the movement of a user's eyes and the static traits of a user's iris. Such eye-based biometric authentication is less vulnerable to attack by counterfeiters, thus improving security when implemented for user authentication.

Unfortunately, such biometric authentication techniques have several drawbacks. As an example, current techniques for performing biometric authentication based on eye movement can yield a high error rate, and iris recognition can be intrusive, such as requiring the user to place his eye close to and at a certain orientation relative to the optical sensor. These drawbacks often cause performance issues and prevent these types of biometric user authentication from gaining widespread commercial acceptance and market use.

Thus, a need exists for improved authentication techniques for addressing many of the drawbacks currently plaguing the performance and reliability of systems implementing conventional biometric authentication algorithms.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to user authentication using eye movement and pupil size change matching wherein authentication is transparent to the user. In order to authenticate a user, the user's eyes are detected from time-to-time by a sensor, and sample data indicative the user's eye movement and pupil size is collected for each of the user's eyes. A plurality of the data samples is collected, and parameters indicative of the user's eye movement and pupil size changes are calculated and compared with predefined parameter templates to determine whether the parameters sufficiently match the templates for authentication purposes. If so, the user is authenticated and permitted to access at least one restricted resource, such as an application or sensitive data stored by a computer system or a restricted area, such as a room of a building. This eye movement and pupil size change matching is performed regularly during use for each user, and action is taken if an unauthorized user is detected. By matching parameters accounting both for the user's eye movement and pupil size changes, the accuracy of user authentication is significantly enhanced. Additionally, performing eye movement and pupil size matching regularly during use of device computer system significantly improves data security, and allows detection of attempts to access the restricted resource by unauthorized users that occur after an initial authentication.

Figure 1:
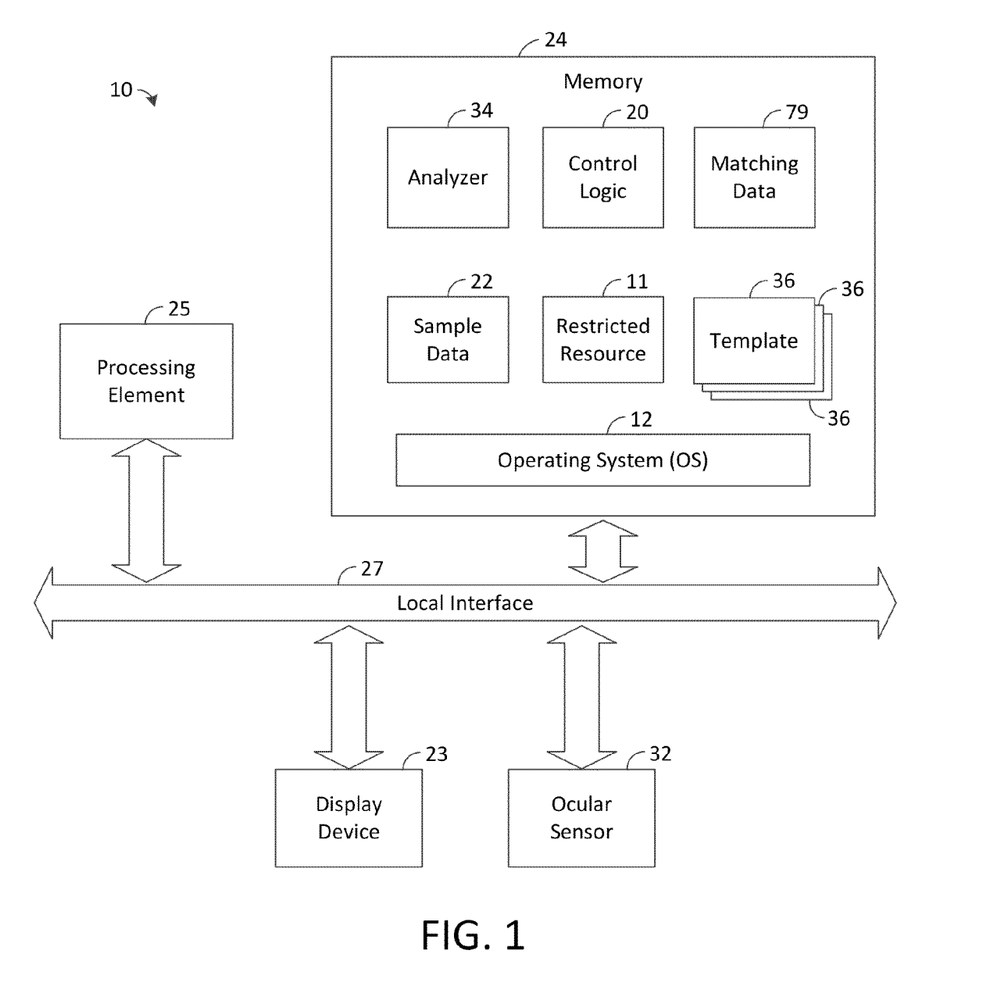
FIG. 1 is a block diagram illustrating an exemplary embodiment of a computing system for performing eye movement and pupil size change matching.

FIG. 1 depicts an exemplary embodiment of a computing system 10 that is configured to perform user authentication, as will be described in more detail below. As an example, the computing system 10 may comprise a mobile device, such as a cellular telephone, laptop computer, table computer, PDA, or any other mobile electronic device having at least one restricted resource 11, such as applications or sensitive data, for which access is to be restricted. Note that in some embodiments, the resource need not be electronically stored, such as an area (e.g., a room or building) to which access is restricted. Note also that in some embodiments, it is unnecessary for the system 10 to be mobile. As an example, the computing system 10 may be a desktop computer or a wall-mounted security device for controlling access (e.g., controlling door locks) to certain rooms or restricted areas. Note that FIG. 1 depicts only one restricted resource 11 for simplicity, but any number of restricted resources 11 is possible in other embodiments.

As shown by FIG. 1, the system 10 has a conventional operating system (OS) 12 that is implemented in software or firmware for generally controlling and managing resources of the system 10. The system 10 also has control logic 20, for generally controlling the authentication operations of the system 10, including collection of sample data 22 that is indicative of the pupil size of at least one user's eye and location where at least one user's eye is looking and authentication of the user based on the sample data 22 collected. The system 10 also has an analyzer 34 for analyzing parameters derived from the sample data 22, as will be described in more detail hereafter. The control logic 20 and analyzer 34 can be implemented in software, hardware, firmware, or any combination thereof. In the exemplary embodiment illustrated by FIG. 1, the control logic 20 and analyzer 34 is implemented in software and stored in memory 24 of the system 10.

Note that the control logic 20 and analyzer 34, when implemented in software, can be stored and transported on any computer-readable medium for use by or in connection with an instruction execution apparatus that can fetch and execute instructions. In the context of this document, a "computer readable medium" can be any means that can contain or store a computer program for use by or in connection with an instruction execution apparatus. In addition, note that it is unnecessary for the control logic 20 and the analyzer 34 to reside at the same location. As an example, at least portions of the control logic 20 may reside on a mobile device, whereas the analyzer 34 may reside at a remote server.

The exemplary system 10 depicted by FIG. 1 comprises at least one conventional processing element 25, such as a digital signal processor (DSP) or a central processing unit (CPU), that communicates to and drives the other elements within the system 10 via a local interface 27, which can include at least one bus. As an example, the processing element 25 is configured to retrieve and execute instructions of software stored in memory 24. Furthermore, a display device 23, for example, a printer, monitor, or liquid crystal display (LCD), can be used to output data to a user of the system 10. In one exemplary embodiment, the system 10 comprises a touchscreen, which can be used to implement the display device 23. In this regard, the touchscreen is configured to display information to the user and also accept inputs from the user, via capacitive sensing or otherwise, when the user touches the touchscreen. In other embodiments, the system 10 may comprise a separate input interface, such as a keyboard, keypad, or mouse for receiving inputs from a user. As shown in FIG. 1, the system 10 also has an ocular sensor 32 that is configured to sense eyes, such as when the user is looking at the display device 23 within range of the ocular sensor 32.

Note that the system 10 may have components and resources not specifically shown in FIG. 1. For example, when the system 10 is implemented as a cellular telephone, the system 10 may have a microphone for converting sounds (e.g., speech) into digital data and a speaker for converting digital data into sound. The system 10 may also have a transceiver and an antenna for wirelessly communicating data (e.g., cellular signals).

At certain times, such as after power up or after a user has submitted an input indicating a desire to access a restricted resource 11, for example sensitive data or applications stored in the computing system 10, the system 10 is configured to authenticate the user before permitting the user access to the restricted resource 11. In this regard, the ocular sensor 32 is configured to continuously detect users' eyes and collect data samples, wherein each sample is indicative of a location where at least one of the user's eyes is looking, the size of the user's pupil and corresponding timestamp indicating the time that the sample was collected. The ocular sensor 32 is configured to generate a plurality of the samples, and the control logic 20 is configured to store the samples in memory 24 as sample data 22. The control logic 20 is configured to calculate parameters based on the sample data 22 indicative of the user's eye movement and pupil size changes when looking at the display device 23, wherein at least one parameter is indicative of change in the user's pupil size, at least one parameter is indicative of the user's eye movement. The control logic 20 is configured to then input or otherwise provide the parameters to the analyzer 34.

The analyzer 34 is configured to compare the calculated parameters with the parameters found in a predefined template 36 that are indicative of the eye movement and pupil size changes of each of the eyes of an authorized user. In particular, the analyzer 34 is configured to determine the correlation by calculating the difference between the parameters derived from the sample data 22 and the parameters stored in template 36, allocating a score to the correlation and determining whether the score exceeds a predefined threshold. If the correlation is sufficient (i.e., the correlation score exceeds the predefined threshold), the parameters calculated from the sample data 22 are deemed to "match" the parameters found in the template 36 such that the user is deemed to be authenticated as an authorized user of the system 10. In this regard, matching of the parameters calculated from the sample data 22 to the template 36 indicates that the sample data 22 is sufficiently similar to (i.e., "matches") the data from which the template 36 was derived such that the user from which the ocular sensor 32 collected the sample data 22 can be deemed to be the same user who provided the information stored in the template 36. In such case, the system 10 (e.g., OS 12) permits the user to access the restricted resource 11 of the system 10 that otherwise would be restricted from access or use. As an example, the system 10 may permit the user to run an application or view sensitive data.

In an exemplary embodiment, the control logic 20 is configured to derive parameters indicative of the user's eye movement and pupil size change based on the sample data 22 in order to define the template 36 that will be associated with an authorized user. Note that the template 36 is defined during an enrollment phase in which the ocular sensor 32 senses the eyes of an authorized user looking at the display device 23. In some embodiments, the control logic 20 may comprise logic for improving accuracy of user authentication by the system 10 by storing data indicative of a calibration routine as part of the enrollment phase. Note that the control logic 20 is configured to display on the display device 23 calibration routine instructions viewable by the user and a message prompting the user to perform the calibration routine. The control logic 20 is configured to recognize data from the ocular sensor 32 indicative of the calibration routine performed by the authorized user, calculate parameters indicative of the authorized user's eye movement and pupil size changes, and store the parameters in template 36 when defining the template 36. In this regard, the control logic 20 uses the parameters calculated during the calibration routine for updating a classification model using machine learning techniques in order to improve accuracy of user authentication, as discussed further below. Note that calibration may help to improve recognition accuracy, but it is possible to achieve sufficient recognition accuracy without the use of calibration.

In yet another embodiment, the control logic 20 is configured to define a template 36 for every user detected by the system 10, where each such template 36 comprises data indicative of the user's authorization. In this regard, if the control logic 20 attempts to authenticate a user, but determines that no template 36 is defined by parameters matching the parameters calculated from the sample data 22, the control logic 20 is configured to define a new template 36 having data associated with the parameters derived from sample data 22, and data indicating that the user who provided the sample data 22 is not identified as an authorized user.

Note that the ocular sensor 32 senses the user's eye movement and pupil size, and the control logic 20 controls the ocular sensor 32 such that it generates sample data 22 indicative of the user's eye movement and pupil size. In the instant embodiment, the ocular sensor 32 is implemented as an eye tracker using infrared oculography for detecting the presence of eyes within sight of the ocular sensor, though other methods for detecting an eye are possible in other embodiments. For example, the ocular sensor 32 is configured to generate data that is indicative of the location where a detected eye is looking, the distance between the ocular sensor 32 and the user's eye, and the pupil size of the eye. In this regard, the ocular sensor 32 transmits infrared radiation (IR) toward the user's eyes and senses IR reflected back toward the ocular sensor 32. Note that the user's pupil absorbs IR, and the user's iris reflects IR. In an exemplary embodiment, the ocular sensor 32 is configured to detect a pattern of reflected IR having a circular IR absorption by the pupil that is recognizable by the ocular sensor 32 as being indicative of the presence of a user's eye. Based on detection by the ocular sensor 32 of the IR reflected by each of the user's eyes, the ocular sensor 32 is configured to generate sample data 22 indicative of the location on the display device 23 where each of the user's eyes is looking, the pupil size of each of the user's eyes, and a corresponding timestamp.

In an exemplary embodiment, the control logic 20 controls the ocular sensor 32 to generate sample data 22 comprising data sensed by the ocular sensor 32 indicative of coordinates (e.g., X, Y, and Z), measurement of the user's pupil size, and a timestamp indicative of the time when the ocular sensor 32 sensed the data, but generation of data indicative of other types of information is possible in other embodiments. In one exemplary embodiment, coordinates X and Y are indicative of the location on the display device 23 where the user's eye is looking and coordinate Z is indicative of the distance between the sensor 32 and the user's eye. The X and Y coordinates may be "screen coordinates" indicative of a point of the display device 23 where the user is looking relative to a reference point on the display device 23. In other embodiments, the coordinates may be relative to other reference points. As an example, a reference point may be point in free space at a certain distance and direction from the sensor 32, on a wall to which the sensor 32 is mounted, or somewhere on the computing system 10. As an example, the sensor 32 may be mounted on a wall near a poster or sign at which the user looks or reads. The coordinates provided by the sensor 32 may be relative to the poster or sign. For illustrative purposes, unless otherwise indicated, it will be assumed hereafter that the measurements from the sensor 32 are screen coordinates relative to a point on the display device 23, but it should be emphasized that other types of coordinates and reference points are possible. Note that the ocular sensor 32 is configured to sense pupil diameter, but other measurements of the user's pupil size are possible in other embodiments.

In the instant embodiment, the ocular sensor 32 is configured to detect both eyes of a user and generate sample data 22 for each eye detected. In addition, the ocular sensor 32 is configured to sense the eyes of multiple users simultaneously and generate sample data 22 for each eye detected, and the control logic 20 is configured to control the resources of the system 10 to perform user authentication for each user's eye detected.

Figure 2A:
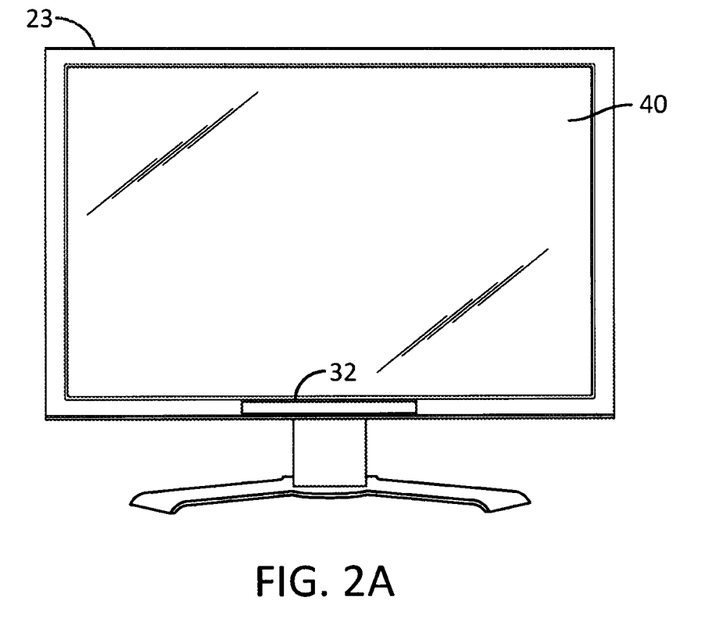
FIG. 2A depicts an exemplary embodiment of a display device, such as depicted by FIG. 1, and an ocular sensor.
Figure 2B:
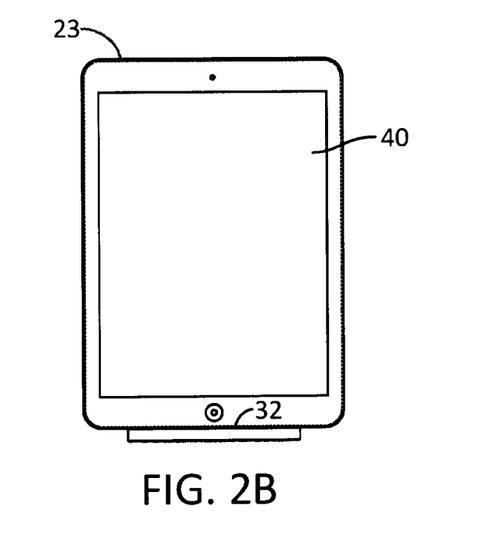
FIG. 2B depicts an exemplary embodiment of a display device, such as depicted by FIG. 1, and an ocular sensor.

FIG. 2A illustrates an exemplary embodiment of a display device 23 having an ocular sensor 32 mounted on the display device 23. Note that the display device 23 comprises a commercially-available display device 23 coupled to an ocular sensor 32 in the form of an eye tracker device using infrared oculography, but other techniques for tracking eye movement and pupil size may be possible in other embodiments. Note that the display device 23 has a screen 40 for displaying output data to the user so that the user can view the output data. In the instant embodiment, the display device 23 is configured to display output data on the screen 40. In this regard, the user is positioned in front of the screen 40 and within sight of the ocular sensor 32 when viewing the output data. In this embodiment, the ocular sensor 32 can detect the eyes of a user positioned in front of the screen 40 of the display device 23 and sense the direction in which the user's eyes are looking. Note that when the user is looking at the screen 40, the control logic 20 is configured to control the ocular sensor 32 such that it collects a plurality of samples so that the movement of the user's eyes and changes in the user's pupil sizes may be determined. Note that in other embodiments, the display device 23 may have some different means of displaying output data to the user (e.g., a touchscreen). FIG. 2B illustrates a display device 23 comprising a touchscreen, such as may be used with a mobile device (e.g., cellular telephone) wherein the ocular sensor 32 is coupled to the display device 23 and oriented such that it can sense the eyes of a user looking at the display device 23. Note also that, in the instant embodiment, at a given point in time the ocular sensor 32 can simultaneously sense the eyes of a plurality of users looking at the screen 40 and generate a data sample for each detected eye.

Figure 3:
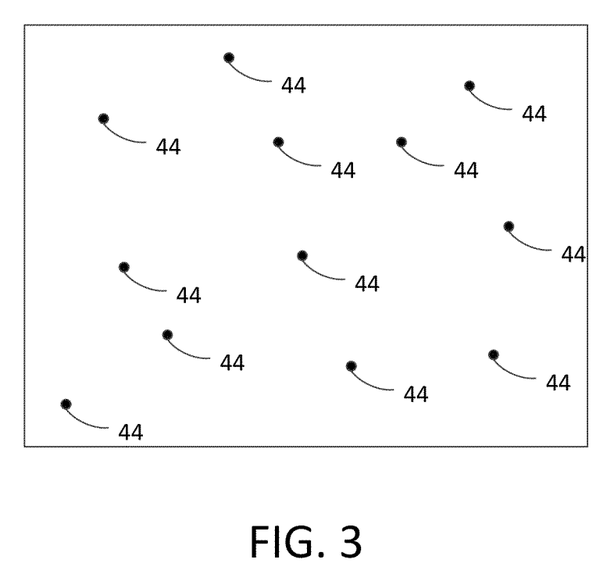
FIG. 3 depicts an exemplary area of a screen with locations users may view.

To better illustrate the foregoing, refer to FIG. 3, which depicts an exemplary area of a screen 40 having locations 44 users may view. In the instant embodiment, when the ocular sensor 32 senses that a user is looking at a location 44 on the screen 40, the ocular sensor 32 provides sample data 22 indicative of the screen coordinates of such location 44. The sensor 32 also is configured to provide pupil size data indicative of the user's pupil size at the time of the sample.

Figure 4:
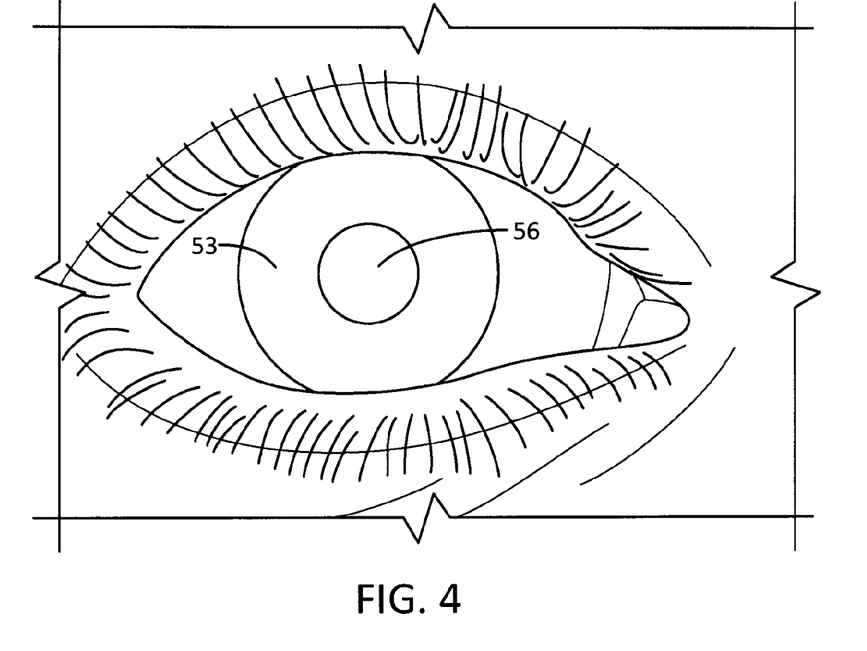
FIG. 4 depicts a user's eye with an iris and a pupil.

In this regard, FIG. 4 depicts a user's eye having an iris 53 and a pupil 56. In an exemplary embodiment, the ocular sensor 32 continuously senses the size and orientation of a user's pupil 56, as when the user's iris 53 adjusts the amount of light entering the pupil 56. As an example, the sensor 32 may provide a value indicating a diameter of the user's pupil 56. Note that other techniques of sensing the size of the user's pupil 56 also are possible.

In one exemplary embodiment, the control logic 20 is configured to derive values indicative of the eye movement and pupil size changes of an authorized user, referred to hereafter as "characteristics," from a plurality of data samples in sample data 22. Such characteristics may be implemented to describe how each of the authorized user's eyes behave using data indicative of movement of each of the user's eyes in correlation with changes in the authorized user's pupil sizes. Exemplary characteristics derived from sample data 22 include eye movement velocity and acceleration, eye movement angular velocity and acceleration, velocity and acceleration of pupil size change, peak eye movement velocity and acceleration and peak pupil size change velocity and acceleration, but other characteristics may be derived in other embodiments. In this regard, various methods may be used to derive each of the characteristics from the sample data 22. Also the control logic 20 may be configured to identify and remove data from sample data 22 that does not constitute a biometric trait via well-known dimensionality reduction techniques, for example, by Principal Component Analysis and chi-squared methods.

As noted above, in an exemplary embodiment, the control logic 20 is configured to calculate characteristics indicative of the average velocity and acceleration of the user's eye movement. According to an exemplary method, when calculating characteristics indicative of eye movement velocity and acceleration, the control logic 20 is configured to determine from the collected sample data 22 values indicative of the displacement between locations 44 where the ocular sensor 32 detects that the user is looking on a section of the screen 40. Techniques for calculating velocity and acceleration values from position measurements indicative of displacement over time are generally well-known. According to an exemplary method, the control logic 20 correlates the displacement between locations 44 with the time interval over which the ocular sensor 32 sensed that the user's eyes moved between the locations 44. In this regard, the control logic 20 is configured to calculate values indicative of the average velocity of the user's eye movement while the user is looking at the screen 40. Similarly, in the instant embodiment, the control logic 20 is configured to calculate characteristics indicative of the acceleration of each of the user's eyes by determining the change in the average eye movement velocity for a given time interval based on the sample data 22 as described above. Note that the control logic 20 may calculate characteristics indicative of the average velocity and acceleration of the user's eyes when moving via techniques other than the exemplary techniques described above.

Additionally, in the instant embodiment, the ocular sensor 32 collects data indicative of the user's pupil size, e.g., "dilation" and "constriction." The control logic 20 is configured to calculate characteristics indicative of change in the user's pupil size from the sample data 22, for example, pupil constriction and dilation velocity and pupil constriction and dilation acceleration. Exemplary techniques for determining velocity and acceleration of size measurements over time are generally well-known.

Note that in the embodiment discussed above, the control logic 20 is configured to determine whether the user's eye movement is indicative of focus on a small area, referred to herein as a "fixation point," of a viewed scene, such as a display screen, or rapid eye movement between fixation points. Eye movement indicative of focus on a fixation point is referred to herein as "fixation," and eye movement indicative of rapid eye movement between fixation points is referred to herein as "saccade." The control logic 20 is further configured to classify each sample as occurring in a period of fixation or a period of saccade. Such classification may then be used in comparisons of the sample data 22 to templates 36 for matching purposes, as will be described in more detail below.

In order to classify the samples, the control logic 20 is configured to calculate at least one parameter indicative of eye movement, such as acceleration or velocity, and to compare the parameter to a threshold. For a period in which the threshold is exceeded, the period and, hence, the samples occurring during the period are classified as fixation. For a period in which the threshold is not exceeded, the period and, hence, the samples occurring during the period are classified as saccade.

In one exemplary embodiment, classification of fixation and saccade periods is based on angular velocity of the user's eye movement. In this regard, the control logic 20 is configured to identify the start of a fixation period when the angular velocity of the user's eye falls below a predefined threshold. As long as the user's eye remains fixated on a particular point, the angular velocity should remain below the threshold, although small perturbations of eye movement are still detectable. Once the user shifts his eyes to look at a different area of the display device 23, the angular velocity should rise above the threshold. When this occurs, the control logic 20 determines that the current fixation period has ended and that a new saccade period has begun. When the user eye reaches the next fixation point, the angular velocity should again fall below the threshold. When this occurs, the control logic 20 determines that the current saccade period has ended, and the next fixation period has begun. Accordingly, based on angular velocity, the control logic 20 identifies periods of fixation and intervening periods of saccade. Note that other techniques and parameters, such as velocity or displacement, for identifying periods of fixation and saccade of the user's eyes are possible in other embodiments.

The control logic 20 is configured to classify the characteristics described above as occurring during a period of fixation or a period of saccade based on the value of the timestamp that is associated with the characteristics calculated from sample data 22. More specifically, for each period of fixation detected, the control logic 20 is configured calculate characteristics indicative of the angular velocity of each of the user's eyes, velocity of the user's left and right eyes, acceleration of the user's left and right eyes, pupil constriction and dilation velocity and pupil constriction and dilation acceleration. For each period of saccade detected, the control logic 20 is configured to calculate characteristics indicative of the angular velocity of the user's eyes, velocity of the user's eyes, acceleration of the user's eyes, pupil constriction and dilation velocity and pupil constriction and dilation acceleration. Based on the measured characteristics, the control logic 20 is further configured to determine various parameters indicative of the mean, standard deviation, or peak value of each of the eye movement and pupil size change characteristics described above for each period of fixation and each period of saccade detected for each of the user's eyes. A parameter calculated from characteristics measured during a period of fixation shall be referred to herein as a "fixation parameter," and a parameter calculated from characteristics measured during a period of saccade shall be referred to herein as a "saccade parameter."

Note that, in one exemplary embodiment, the template 36 associated with a given user defines fixation parameters and saccade parameters for each eye of such user. That is, a given template defines left-eye fixation parameters derived from measured movements of the user's left eye during at least one fixation period and right-eye fixation parameters derived from measured movements of the user's right eye during at least one fixation period. The template 36 also defines left-eye saccade parameters derived from measured movements of the user's left eye during at least one saccade period and right-eye saccade parameters derived from measured movements of the user's right eye during at least one saccade period.

Duration authentication, the analyzer 34 is configured to compare the fixation parameters derived from sample data 22 by the control logic 20 with fixation parameters stored in a template 36. Specifically, the analyzer 34 is configured to compare left-eye fixation parameters from the sample data 22 with left-eye fixation parameters from the template 36 and to compare right-eye fixation parameters from the sample data 22 with right-eye fixation parameters from the template 36. The analyzer 34 is also configured to compare left-eye saccade parameters from the sample data 22 with left-eye saccade parameters from the template 36 and to compare right-eye saccade parameters from the sample data 22 with right-eye saccade parameters from the template 36.

In one exemplary embodiment, the analyzer 36 compares one set of parameters from another by subtraction, but other techniques may be used in other embodiments. Note that, in some embodiments, the analyzer 34 may be configured to perform other comparisons in addition to or in lieu of the comparisons described above. As an example, the analyzer 34 may be configured to compare right-eye parameters to left-eye parameters. In one exemplary embodiment, the analyzer 34 is configured to compare left-eye parameters of sample data 22 to left-eye parameters of a template 36 and right-eye parameters of sample data 22 to right-eye parameters of the template 36, as described above. Then, the analyzer 34 compares the differences in left-eye parameters to differences in right eye parameters. In other embodiments, other comparisons may be performed.

After performing comparisons, the analyzer 36 calculates a value, referred to herein as "correlation score," indicative of how close the compared parameters match. If the correlation score indicates a sufficiently high similarity, e.g., exceeds a predefined threshold, then the control logic 20 is configured to authenticate the user. If the correlation score does not indicate a sufficiently high correlation, then the control logic 20 does not authenticate the user. The control logic 20 further reports the result of the authentication to the operating system 12, which then may control whether the user is permitted to access the restricted resource 11 based on such result.

Note that the control logic 20 is configured to control the ocular sensor 32 to collect data samples for storing in sample data 22 at a particular frequency, hereinafter referred to as a "refresh rate." In general, a higher refresh rate (e.g., cycles per second, or hertz) enables the control logic 20 to control the ocular sensor 32 to collect data samples at a higher resolution. In an exemplary embodiment, sample data 22 comprises data samples collected at 120 hertz. In this regard, the control logic 20 is configured to use sample data 22 collected at a higher refresh rate to calculate characteristics more accurately describing the user's eye movement and pupil size changes than is possible using sample data 22 collected at a lower refresh rate.

Figure 5:
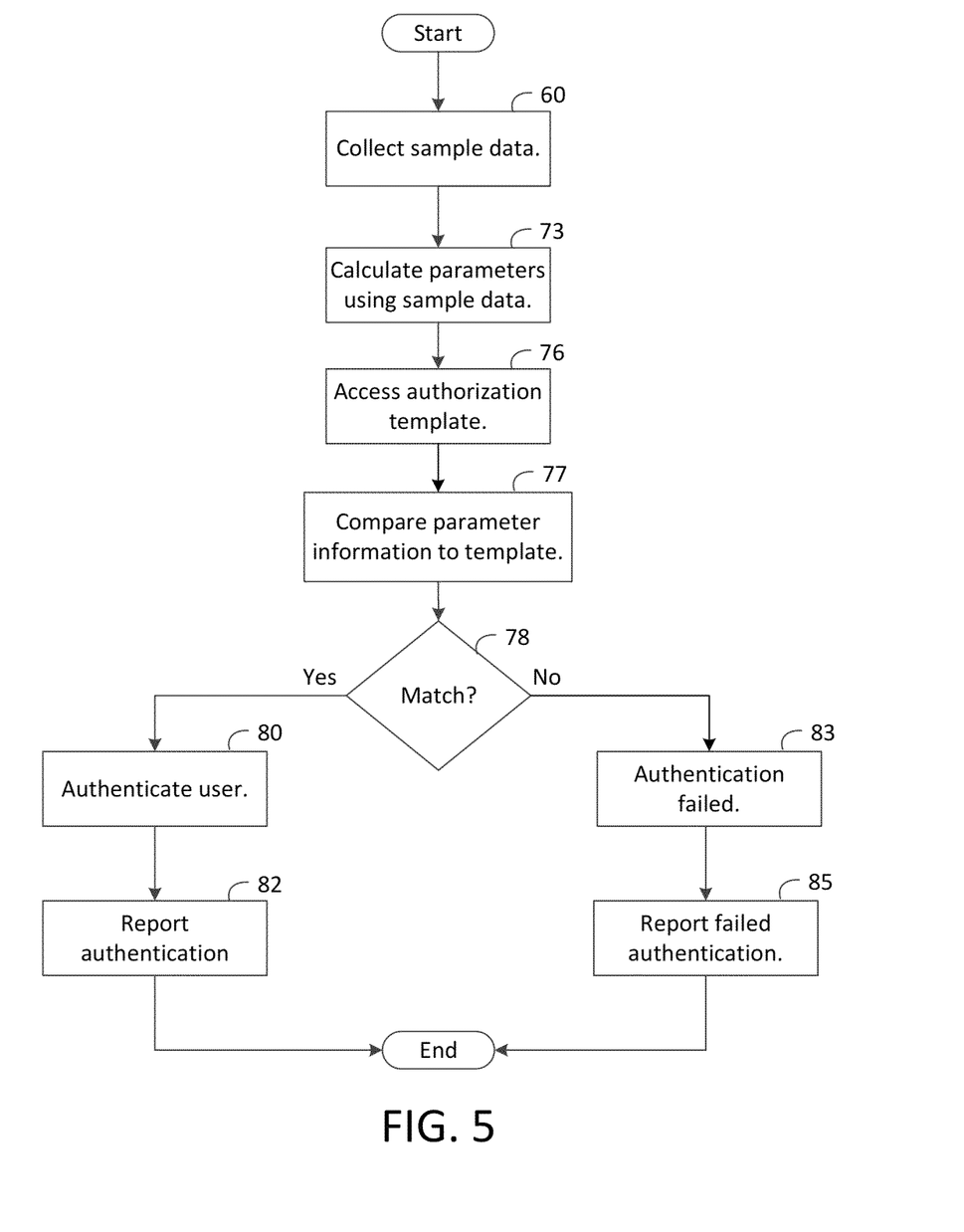
FIG. 5 is a flowchart illustrating an exemplary method for authenticating a user of a computing system such as is depicted by FIG. 1.

To better illustrate the foregoing, FIG. 5 illustrates an exemplary method for user authentication described above. The control logic 20 is configured to define a template 36, where each template 36 corresponds to parameters indicative of eye movement and pupil size change of an authorized user. After a template 36 has been defined, user authentication may be performed as desired. In this regard, when user authentication is desired, the control logic 20 is configured to collect sample data 22 via the ocular sensor 32 as described above and shown by block 60 in FIG. 5. This sample data 22 is processed as described above in order to derive parameters indicative of the user's eye movement and pupil size changes during periods of fixation and saccade, as shown by block 76 of FIG. 5.

In this regard, the control logic 20 analyzes the sample data 22 to identify periods of fixation and periods of saccade. For a given period of fixation, the control logic 20 calculates the mean, standard deviation, and peak values of the various eye movement characteristics described above. Also, for a given period of saccade, the control logic 20 calculates the mean, standard deviation, and peak values of the various eye movement characteristics described above.

The control logic 20 is configured to provide the calculated parameters to the analyzer 34, which compares such parameters to parameters in each template 36 to determine whether a match is found, as shown by block 77 of FIG. 5. For example, for a given template 36, the analyzer 34 may compare the mean, standard deviation, and peak values of fixation parameters in the sample data 22 to mean, standard deviation, and peak values of fixation parameters in the template 36, and the analyzer 34 may compare the mean, standard deviation, and peak values of saccade parameters in the sample data 22 to mean, standard deviation, and peak values of saccade parameters in the template 36. In other embodiments, other parameters may be compared.

If the analyzer 34 determines that the parameters derived from the sample data 22 match any of the templates 36 associated with authorized users, as shown by block 78 of FIG. 5, the user is authenticated. In this regard, for each compared template 36, the analyzer 34 calculates a correlation score indicating how similar the parameters derived from the sample data 22 match the parameters derived from the template 36. If the correlation score exceeds a predefined threshold, the analyzer 34 notifies the control logic 20 that a match was found. In such case, the control logic 20 is configured to authenticate the user and report the authentication to the OS 12 or other component, as shown by blocks 80 and 82 of FIG. 5. As an example, the control logic 20 may transmit a message to the OS 12 indicating that a match was found based on the newly-acquired sample data 22. In response, the OS 12 may permit the user to provide inputs for accessing restricted resources 11 of the device 10 that would otherwise be restricted from access. In addition the control logic 20 is also configured to display, via the display device 23, a message indicating that the authentication attempt was successful.

If the correlation score does not exceed a predefined threshold, then the analyzer 34 notifies the control logic 20 that a match was not found. In such case, the control logic 20 is configured to determine that the authentication failed and to report the failed authentication attempt, as shown by blocks 83 and 85 of FIG. 5. As an example, the control logic 20 may transmit a message to the OS 12 indicating that a match was not found based on the newly-acquired sample data 22. In response, the OS 12 may prevent the user from accessing one or more restricted resources 11 of the computing system 10, such as applications or sensitive data stored in the system, 10, until an authentication attempt is successfully performed. In addition, the control logic 20 is also configured to display, via the display device 23, a message indicating that the authentication attempt was not successful.

In an exemplary embodiment, the system 10 is configured to detect the eyes of unauthorized users looking at the display device 23 during use by an authorized user, referred to herein as "shoulder surfing." The ocular sensor 32 is configured to regularly sense eyes looking at the display device 23 after an initial authentication, and at various other times, for example during a period of time when an authorized user accesses a restricted resource 11 and during an authorized user's use of the restricted resource 11. For every user's eye looking at the display device 23 detected by the ocular sensor 32, the system 10 is configured to perform authentication such as depicted in FIG. 5, and to continuously monitor (i.e., via sensing by the ocular sensor 32) each detected eye while the user is looking at the display device 23.

When the system 10 fails to authenticate a detected eye, the control logic 20 is configured to take some action. In this regard, detection of an unauthorized eye may indicate that an unauthorized user is shoulder surfing or has improperly obtained access of the system 10. In response to such a detection, the control logic 20 may report the detection, such as displaying a message, or the control logic 20 may restrict access to the resource 11, such as preventing further use of the resource 11 or preventing further display of data from the resource 11. In one exemplary embodiment, before taking such action, the control logic 20 first monitors the unauthorized eye to determine how long it is viewing the display device 23. If the viewing continues for a specified amount of time indicating that the unauthorized user is staring at the display device 23 as opposed to casually glancing at the display device 23, then the control logic 20 takes action for protecting the resource 11, such as displaying a message indicating that such activity has been detected or terminating (at least temporarily) use of the resource 11. As an example, the control logic 20 may inform the operating system 12 that an unauthorized user is viewing the display device 23, and the operating system 12 may then terminate operation of the resource 11, prevent the display device 23 from displaying data from the resource 11, or otherwise control the system 10 such that information from resource 11 is protected.

In various embodiments described above, the control logic 20 and the analyzer 34 are described as being implemented on a computing system 10, such as a desktop, laptop, or handheld computer (e.g., a smartphone). However, it is unnecessary for the control logic 20 and the analyzer 34 to be implemented on a single device. Specifically, portions of the control logic 20 and/or the analyzer 34 may be implemented by multiple devices. As an example, it is possible for measurements from the ocular sensor 32 to be received at a mobile device, such as a smartphone, and for data indicative of such measurements to be transmitted by the mobile device to a server via a network. In such example, the server may analyze the data and perform matching and send data indicative of the results of the matching back to the mobile device, which then controls access to a resource of the mobile device based on the data indicative of the matching results. In yet other embodiments, other arrangements and operations of the system 10 are possible.

The authentication performed by the system 10 is not necessarily limited to granting access to a restricted resource 11 as described in detail above, but also may be performed in a variety of other applications, as further described hereafter. As an example, the system 10 may be used to perform non-repudiation of inputs provided by a user. In this regard, using the system 10, a user may provide certain inputs, such as submitting a financial payment or withdrawal, authorization to make a purchase or sale, a request to update protected information (e.g., a financial account), or other input for which it would be desirable to confirm the identity of the user who submitted the input. In this regard, when a transaction or event occurs based on an authorization or other input from a particular user, such user may ultimately deny having provided the authorization or other input in an effort to prevent him from being bound to the transaction or otherwise being associated with the event. In such case, a hacker may have spoofed the user's identity, the user may fail to remember providing an input that resulted in the transaction or event, or the user may simply lie about whether he provided the input.

In one exemplary embodiment, the system 10 measures sample data 22 indicative of eye movement and pupil size change at or close to the time that an input is received by the system 10, and the system 10 correlates such sample data 22 with the input. Thereafter, the sample data 22 may be analyzed to confirm the identity of the person who was looking at the display device 23 or otherwise present at the system 10 when the input was received. As an example, the sample data 22 may be compared to a template 36 according to the techniques described above to determine whether the person associated with the template 36 is the same person from which the sample data 22 was captured at the approximate time that input was received by the system 10.

For illustrative purposes, assume that a user of the system 10 navigates to a website and logs into an account, which may be used to purchase securities (e.g., stocks). The user may be authenticated using the techniques described above or otherwise before being permitted to access the account. After accessing the account, the user may provide an input for purchasing a security. After the purchase, assume that the price of stock falls such that the value of the purchased stock is below the price paid for it, and also assume that the user later repudiates the purchase. In this regard, the user may allege that, even though he was authenticated at the beginning of the session with the website, he did not actually submit the input for authorizing the purchase of the security. The user may even allege that an unauthorized user had access to or control of the system 10 at the time of authorization.

In one exemplary embodiment, the control logic 20 is configured to capture sample data 22 indicative of at least one eye measured by the ocular sensor 32 at the approximate time of the input (e.g., just before, during, or just after the input). Such sample data 22 may include the same parameters described above for authentication of the user. In addition, the sample data 22 is captured sufficiently close to the time of the input (e.g., a few seconds) such that it is likely that user from which the sample data 22 was derived submitted the input. The control logic 20 is configured to correlate the sample data 22 with data indicative of the input, referred to hereafter as "input data," and to transmit the input data and the sample data 22 to a server, such as the server hosting the website for which the input causes an event to occur, such as a purchase of a security. The sample data 22 and data indicative of the input may be stored at the server.

Later if the user repudiates the input or, in other words, alleges that he did not provide the input, the sample data 22 may be retrieved and analyzed to determine whether his eyes were detected by the ocular sensor 32 at the time the system 10 received the input. As an example, a system 10 (like the one shown by FIG. 1) may be used to define a template 36 associated with the user, and the sample data 22 correlated with the input may be compared to such template 36 to determine whether there is a match, according to the techniques described above. That is, if there is a match, the user from which the template 36 was derived is essentially authenticated to be the same person who submitted the input. In such case, the user should be unable to repudiate the input. Note that the authentication performed in this embodiment may be performed by the server or other device. As an example, after the user attempts to repudiate the input, a system 10 (like the one shown by FIG. 1) may be used to analyze the eye of the user to define a template 36. Note that the system 10 does not need to be the same one originally used by the user in order to submit the input. The server may transmit the sample data 22 to the system 10, which then compares the sample data 22 to the template 36 to confirm whether there is a match. If so, the user may be prevented from repudiating the input.

Additionally, in other embodiments, the system 10 may be configured for other applications using the same or similar techniques described above. For example, the logic 20 may be configured to determine whether an individual is under the influence of a substance (e.g., alcohol or drugs) based on parameters derived from eye movement and pupil size changes. In an exemplary embodiment, the system 10 is configured to detect eye movement and pupil size changes and calculate parameters based on sample data 22 as described above. As described herein, the sensor 32 may detect sample data 22 and the logic 20 may calculate parameters indicative of indicative of periods of fixation and saccade. However, rather than comparing the parameters with parameters stored in a template 36 for authentication purposes, the logic 20 is configured to perform such comparison in order to determine whether the user's eye movement and pupil size changes demonstrate sufficient correlation to (i.e., match) eye movement and pupil size changes indicative of an intoxicated individual.

In this regard, the logic 20 may be configured to compare the parameters calculated from sample data 22 for the current user with parameters stored in a template 36 indicative of eye movement and pupil size changes of an intoxicated individual. It may be determined from empirical data that certain eye movements are associated with an individual under the influence of alcohol or drugs. As an example, it may be determined that rate of pupil dilation and/or constriction of a user under the influence of a particular substance is typically below a threshold while such parameter may be above the threshold for a sober person. In such case, the control logic 20 may compare the measured parameter, such as the rate of acceleration or velocity change in pupil size, to the threshold and provide an indicative that the user is likely under the influence of the substance is the measured parameter is below the threshold. In other embodiments, other types of comparisons may be performed, and any number of comparisons may be used as factors in deciding whether the user is likely under the influence of the substance. In such embodiment, the template 36 is indicative of one or more parameters typically associated with a person under the influence of the substance. As described above with authentication, the parameters may be measured during periods of fixation and saccade, and the same parameters used for authentication may be used for determining whether the person is under the influence of the substance.

In the above embodiment, the system 10 may be used by law enforcement to establish whether a person is under the influence of a controlled substance or is intoxicated. As an example, the system 10 may be implemented as a mobile device that is carried into the field by law enforcement personnel for use in performing sobriety tests (e.g., testing people to determine whether they are under the influence of a controlled substance or intoxicated). In another embodiment, the system 10 may be mounted on a vehicle, such as the vehicle's dashboard. In such embodiment, the system 10 may automatically analyze the driver's eyes to perform a sobriety test or other type of mental capacity test (e.g., determining whether the driver is mentally impaired for the purposes of driving a vehicle). If the system 10 determines that the driver is mentally impaired whether due to intoxication or other reason, the system 10 may take various actions. As an example, the system 10 may transmit a message to law enforcement, to a mobile device (e.g., cellular phone) of the driver, or to other users for providing an alert about the driver's condition. Such message may include location information indicative of the vehicle's current location based on a location sensor, such as a global positioning system (GPS) sensor. The system 10 may also be communicatively coupled to a vehicular control system (not shown) for affecting the operation of the vehicle based on the result of the sobriety test. As an example, in response to a result indicating that the driver has failed a mental capacity test, the control system may prevent the engine from starting or turn off the engine so that the vehicle is at least temporarily prevented from being driven. Other actions in other embodiments are possible.

Note that the vehicle may also be controlled based on an authentication result for the driver. For example, if the driver is not authenticated or in other words, determined not to be an authorized driver of the vehicle, the system 10 may transmit a message (e.g., an alert, which indicates the location of the vehicle) or affect the operation of the vehicle (e.g., prevent the engine from operating so that the vehicle is temporarily prevented from being driven, as described above).

In one exemplary embodiment, the system 10 may comprise some means of introducing a stimulus to the individual's eyes for purposes of measuring sample data 22 indicative of particular reactions of the individual's eyes to the stimulus, for example shining a light source (not specifically shown) at the user's eye to measure velocity and acceleration of pupil dilation or constriction in response to light from the light source and/or removal of such light. In this regard, the system 10 may be configured to activate the light source (not specifically shown) for a pre-defined duration such that the logic 20 can calculate parameters for comparison with parameters in a pre-defined template, as described herein. Note that a variety of stimuli may be introduced to measure reactions of an individual's eyes to the stimuli in other embodiments for purposes of determining intoxication or other desired information about the individual, as further described below.

In an additional exemplary application of the techniques described above, assume that certain medical conditions (e.g., diseases or disorders) can be detected in their early stages based on an individual's eye movement and pupil size changes. In this regard, the system 10 can be configured to identify individuals demonstrating eye movement and pupil size changes indicative of the onset of a medical condition for which diagnosis is desired. The system 10 uses the techniques described herein to compare parameters indicative of the individual's eye movement and pupil size changes with parameters stored in a pre-defined template 36 indicative of the eye movement and pupil size changes an individual likely would demonstrate during the onset of a medical condition for which diagnosis may be desired. For example, if the system 10 detects that parameters calculated from sample data 22 indicative of velocity and acceleration for periods of fixation and saccade or velocity and acceleration of pupil constriction and dilation exceeds or does not exceed a pre-defined threshold found in a template 36 (depending upon the selected parameters and related medical condition), the logic 20 is configured to determine that the parameters indicate the onset of a medical condition for which diagnosis is desired. As noted above, the system 10 may comprise a means for introducing a stimulus, (e.g., light from a light source described above) in order to attempt to measure a reactions of the individual's eyes to the stimulus based on parameters calculated from sample data 22 taken before and after the stimulus is introduced. In this regard, the system 10 is configured to compare the parameters calculated from such sample data 22 with parameters found in a pre-defined template 36. Note that it is not necessary for the system 10 to introduce a stimulus in all embodiments in order to perform a function of detection of the onset of a medical condition based on eye movement and pupil size changes.

Now, therefore, the following is claimed:

1. An authentication system, comprising:
   an ocular sensor configured to sense an eye of a first user and to provide data indicating a location at which the eye is looking and a size of a pupil of the eye;

memory for storing predefined parameters associated with the first user, the predefined parameters including first fixation parameters and first saccade parameters, the first fixation parameters indicative of eye movement characteristics and pupil size change characteristics for an eye of an authorized user during periods of fixation, the first saccade parameters indicative of eye movement characteristics and pupil size change characteristics for the eye of the authorized user during periods of saccade; and logic configured to calculate a plurality of parameters based on the data and to identify periods of fixation and periods of saccade for the eye of the first user based on the data, the plurality of parameters including second fixation parameters and second saccade parameters, the second fixation parameters indicative of eye movement characteristics and pupil size change characteristics for the eye of the first user during the identified periods of fixation, the second saccade parameters indicative of eye movement characteristics and pupil size change characteristics for the eye of the first user during the identified periods of saccade, the logic configured classify each of the plurality of parameters as occurring during a respective one of the identified periods of fixation or as occurring during a respective one of the identified periods of saccade, the logic further configured to perform, based on classification, by the logic, of the plurality of parameters as occurring during the identified periods of fixation or the identified periods of saccade, (1) first comparisons between the first fixation parameters and the second fixation parameters and (2) second comparisons between the first saccade parameters and the second saccade parameters, the logic further configured to authenticate the first user based on the first comparisons and the second comparisons.

2. The system of claim 1, wherein the ocular sensor resides on a mobile device, and wherein the logic is configured to permit the first user to access a resource of the mobile device in response to authentication of the first user by the logic.

3. The system of claim 1, further comprising a display device, wherein the data includes screen coordinates of the display device.

4. The system of claim 1, wherein one of the second saccade parameters is indicative of a velocity or an acceleration of pupil constriction or dilation.

5. The system of claim 1, wherein one of the second fixation parameters indicates a velocity or an acceleration of an eye movement or a pupil size change for the eye of the first user during one of the identified periods of fixation.

6. The system of claim 1, wherein the logic is configured to calculate an acceleration of an eye movement or a pupil size change for the eye of the first user during one of the identified periods of saccade.

7. The system of claim 1, wherein the logic is configured to identify the periods of fixation and the periods of saccade for the eye of the first user based on measurements of angular velocity for the eye of the first user.

8. The system of claim 1, wherein the logic is configured to compare at least one of the plurality of parameters to a threshold and to identify at least one of the periods of fixation or the periods of saccade for the eye of the first user based on a comparison of the at least one of the plurality of parameters to the threshold, and wherein the at least one of the plurality of parameters is indicative of an eye movement characteristic for the eye of the first user.

9. The system of claim 1, wherein for one of the identified periods of saccade, the logic is configured to calculate one of the saccade parameters by mathematically combining multiple measurements of pupil size or pupil size changes to determine a mean of pupil size or pupil size changes for the one of the identified periods of saccade.

10. The system of claim 1, wherein the logic is configured to perform a comparison between a parameter indicative of an eye movement characteristic or a pupil size change characteristic for the eye of the first user to a parameter indicative of an eye movement characteristic or a pupil size change characteristic for a second eye of the first user, and wherein the logic is configured to authenticate the first user based on the comparison.

11. An method authentication method, comprising:
sensing, by an ocular sensor, an eye of a first user, wherein the sensing comprises providing data indicating a location at which the eye is looking and a pupil size of the eye;

storing, in memory, a plurality of predefined parameters associated with the first user, the predefined parameters including first fixation parameters and first saccade parameters, the first fixation parameters indicative of eye movement characteristics and pupil size change characteristics for an eye of an authorized user during periods of fixation, the first saccade parameters indicative of eye movement characteristics and pupil size change characteristics for the eye of the authorized user during periods of saccade;

identifying, based on the data, periods of fixation and periods of saccade for the eye of the first user based on the data;

calculating, based on the data, a plurality of parameters; including second fixation parameters and second saccade parameters, the second fixation parameters indicative of eye movement characteristics and pupil size change characteristics for the eye of the first user during the identified periods of fixation, the second saccade parameters indicative of eye movement characteristics and pupil size change characteristics for the eye of the first user during the identified periods of saccade;

classifying each of the plurality of parameters as occurring during a respective one of the identified periods of fixation or as occurring during a respective one of the identified periods of saccade;

comparing the first fixation parameters with the second fixation parameters based on the classifying;

comparing the first saccade parameters with the second saccade parameters based on the classifying; and comparing authenticating the first user based on the comparing the first fixation parameters and the comparing the second fixation parameters.

12. The method of claim 11, wherein the ocular sensor resides on a mobile device, and wherein the method further comprises permitting the first user to access a resource of the mobile device based on the authenticating.

13. The method of claim 11, wherein one of the second saccade parameters is indicative of a velocity or an acceleration of pupil constriction or dilation.

14. The method of claim 11, wherein one of the second fixation parameters is indicative of a velocity or an acceleration of an eye movement or a pupil size change for the eye of the first user during one of the identified periods of fixation.

15. The method of claim 11, wherein one of the second saccade parameters is indicative of an acceleration of an eye movement or a pupil size change for the eye of the first user during one of the identified periods of saccade.

16. The method of claim 11, wherein the identifying the periods of fixation and the periods of saccade for the eye of the first user is based on measurements of angular velocity for the eye of the first user.

17. The method of claim 11, further comprising comparing at least one of the plurality of parameters to a threshold, wherein the identifying comprises identifying at least one of the periods of fixation or the periods of saccade for the eye of the first user based on the comparing the at least one of the plurality of parameters to the threshold, and wherein the at least one of the plurality of parameters is indicative of an eye movement characteristic for the eye of the first user.

18. The method of claim 11, further comprising comparing a parameter indicative of an eye movement characteristic or a pupil size change characteristic for the eye of the first user to a parameter indicative of an eye movement characteristic or a pupil size change characteristic for a second eye of the first user, wherein the authenticating is based on the comparing the parameter indicative of the eye movement characteristic or the pupil size change characteristic for the eye of the first user to the parameter indicative of the eye movement characteristic of the pupil size change characteristic for the second eye of the first user.

\* \* \* \* \*